United States Patent Office 2,889,257
Patented June 2, 1959

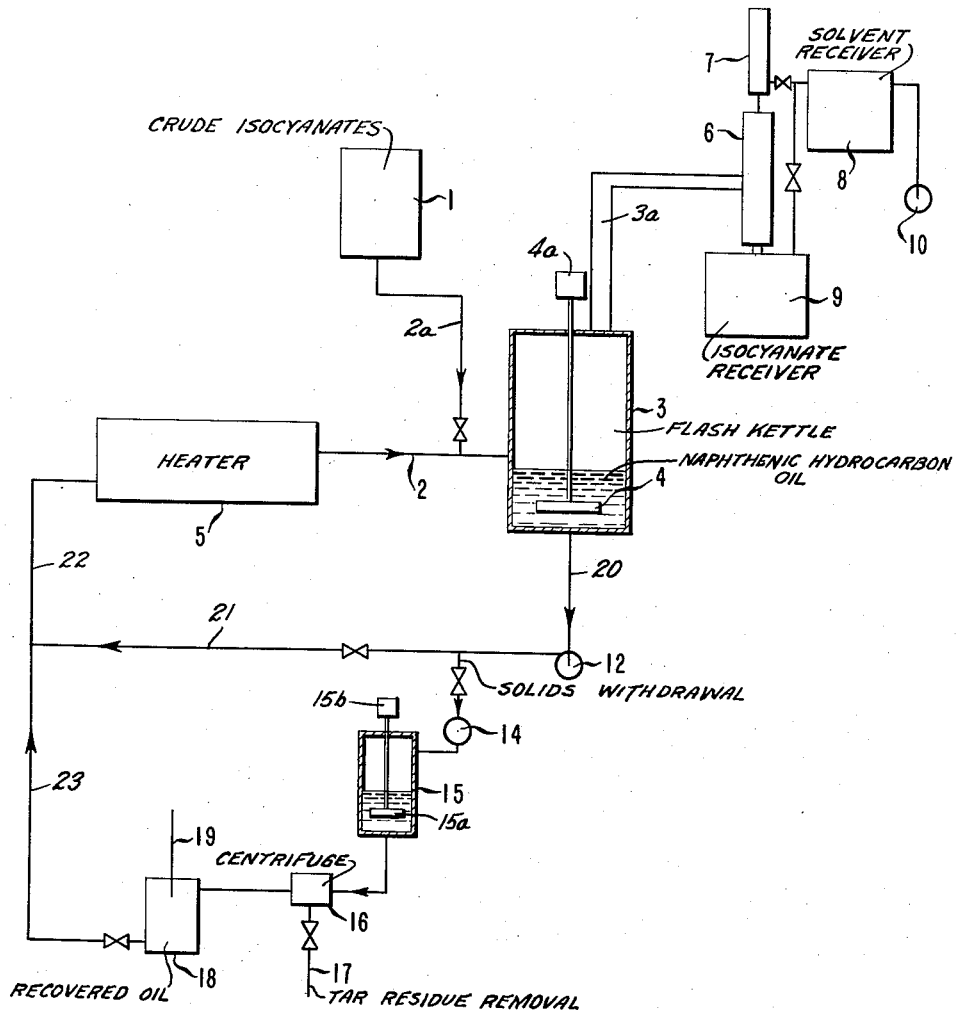

2,889,257

DISTILLATION OF TAR RESIDUES

Samuel E. C. Griffin, Wilmington, Del., Wilford E. Railing, Penns Grove, N.J., and Jesse Craig Yacoe, Wilmington, Del., assignors to E. I. du Pont de Nemours and Company, Wilmington, Del., a corporation of Delaware Application May 17, 1956, Serial No. 585,482

4 Claims. (Cl. 202—52)

This invention relates to a process for recovering isocyanates from the reaction mass in which they are formed and from the tarry material normally resulting from the distillation of isocyanates. This application is a continuation-in-part of our co-pending application Serial No. 521,451, filed July 12, 1955, now abandoned.

In the preparation of organic isocyanates, such as toluene-2,4-diisocyanate by phosgenation of the corresponding diamine in an inert solvent such as ortho-dichlorobenzene, minor amounts of complex higher-boiling side-products are also generally formed. These materials accumulate as a distillation heel (residue or tar) when the solvent and then the isocyanate are distilled. While most of the isocyanate can be removed from the reaction mass by ordinary distillation, an appreciable quantity remains in the concentrated viscous tar, from which complete removal by simple distillation techniques is difficult. Failure to recover this quantity of valuable product represents a significant economic loss.

The use of plasticizing agents in the distillation of isocyanates has been disclosed, but various difficulties have been encountered, mainly because the nonvolatile residues are miscible with the plasticizers, making recovery and re-use of the plasticizers expensive or impossible.

It is therefore an object of the invention to provide a simple and economical method for recovering organic isocyanates from the reaction mass in which they are formed. It is a more specific object of the invention to provide a process in which the tarry materials formed in the preparation of the isocyanates are converted to a form from which the occluded organic isocyanates are readily distilled and the final tar residues are readily separated and disposed of. A still further object of the invention is to provide a method for distilling the volatile organic isocyanates from the tar residues with which they are occluded, after ordinary distillation of the isocyanate from the reaction mass in which it is formed.

According to the present invention, the organic isocyanates may be recovered directly from the phosgenation mass in which they are formed by first removing the phosgene and hydrogen chloride and then introducing the solvent solution of the crude organic isocyanate mass into a hot naphthenic hydrocarbon oil which does not distill at 300° C. under 10 millimeters' absolute pressure and from which the solvent and isocyanate are readily distilled. The non-volatile tarry materials from which the volatile organic isocyanate is vaporized are converted to granular residues which are suspended in the high boiling oil. These residues can be readily removed from the oil by ordinary filtration and the oil can then again be used in the flashing process. The oil is preferably maintained at a temperature of from 200° to 315° C. and the pressure in the vessel below 80 mm. absolute. In any case, the oil is maintained somewhat below its boiling or distillation point.

In the phosgenation of aromatic amines to produce the organic isocyanates, the excess phosgene, and the hydrogen chloride which results from the reaction, are removed from the crude organic isocyanate by a flashing operation or by blowing with an inert gas such as nitrogen. This crude organic isocyanate or a solvent solution of the same, depending upon the process used for its preparation, may then be distilled to remove a major portion of the organic isocyanate from the non-distillable residues or, according to the present invention, the crude organic isocyanate may be fed directly into the hot naphthenic hydrocarbon oil as above described, from which both the organic isocyanate and the solvent are flashed and separated in a fractionating column. Alternatively, where an organic solvent is used in the preparation of the organic isocyanate, the vapors may be introduced into a heated distillation column from which the solvent vapors are removed overhead, and the liquid isocyanate removed from the bottom of the column. In this case, the isocyanate concentration in the solvent may be as low as from 5% to 10%, although preferably the concentration is no lower than 10% for reasons of economy in handling the solvent.

The process of this invention is applicable in the recovery of organic isocyanates which have a boiling point such that they can be flashed off at temperatures of from 200° to 315° C. and at pressures of preferably 70 mm. to 80 mm. or lower. Monoisocyanates such as phenylisocyanate, naphthylisocyanate, hexylisocyanate and octadecylisocyanate, and polyisocyanates such as 2,4- and 2,6-toluene-diisocyanate, 4-chloro- and 4-methoxy-m-phenylene diisocyanate, hexamethylene diisocyanate, 4,4'-diisocyanatodiphenylmethane, 4,4'-diisocyanato-3,3'-dimethyldiphenylmethane and toluene-2,4,6-triisocyanates, are representative of the type of organic isocyanates which can be distilled by the process of this invention.

In the case where the solvent is removed and then most of the isocyanate distilled under vacuum, it is easy to distill the isocyanate until the tar residue contains 75% or less of isocyanate, but it is usually impractical to reduce the concentration of the isocyanate in the tar to below about 40% since the residue becomes increasingly viscous and more difficult to handle, although tar residues containing as low as 25% of the isocyanate may be obtained. Ordinarily the lower limit of concentration of the diisocyanate, such as toluene-2,4-diisocyanate, for example, is determined by the viscosity of the resulting tar and the facilities available for handling it. The viscosity of a mixture of 40% to 45% of toluene diisocyanate in the tar residue is about 1000 centipoises at from 130° to 140° C. At lower concentrations the viscosity rises abruptly. Tar residues containing more of the 2,4-diisocyanate are more fluid and are more easily handled.

The medium in which the process of the present invention is carried out is a naphthenic hydrocarbon oil of the nature of a lubricating oil bright stock. These refined oils consist essentially of carbocyclic ring structures having paraffinic side chains. The majority of the carbocyclic rings are saturated, but a small portion may be aromatic in nature, depending on the source of the parent crude oil. The percent of aromatic rings present in the molecule may range up to about 10% of the total hydrocarbon composition. These refined oils do not boil at 300° C. at 6 mm. absolute pressure. A typical example of this bright stock suitable for use in the process of the present invention can be characterized by Saybolt Universal viscosity of 185 to 220 seconds at 210° F. and specific gravity of 0.907 at 15.56° C. Another typical stock employed has a Saybolt Universal viscosity of from 150 to 155 seconds at 210° F. and a specific gravity of 0.902 at 15.56° C.

When used in a ratio of at least 1 of oil to 1 of tar, these oils give a clean-cut separation of the isocyanate from the tar, and also a clean separation of the isocyanate from the oil, and result in a solid suspension of the tar residue which can be readily removed by filtration from the oil. Higher ratios of oil to tar will ordinarily be used, such as 2:1 to 4:1. Larger excesses may of course be used when desired.

Because of the low volatility of these oils they should not distill with the isocyanate at the temperature employed. When a small quantity of the oil is entrained by the distilling vapors of the isocyanate, a simple distillation is sufficient to completely separate the isocyanate from the oil and the oil residue can be returned to the flash distillation kettle. These oils, which will be referred to in the present application as "naphthenic hydrocarbon oils," have good thermal stability under the conditions employed in the present process, since they do not crack or form unsaturated compounds during the heating, and, since they are free from olefinic unsaturated hydrocarbons, they are not prone to undergo oxidative degradations and polymerizations which would ultimately reduce the life of the oil and also reduce the yield of the isocyanate that could be obtained.

With this type of oil, as distinguished from other solvents that have high boiling points, the tars do not dissolve but instead disperse in the oils with the result that the more volatile isocyanate can be readily distilled off and the non-volatile residue remains suspended as a granular solid which can be easily and completely removed by filtration from the oil. The higher boiling saturated hydrocarbons of the paraffinic type including paraffin wax have been found to give poor results since the non-volatile tar residues in such oils do not form granular solids which can be readily separated from the oil. Although meeting the requirements of low volatility and thermal stability at operating temperatures, such oils do not properly disperse the tar. In some cases the tar tends to agglomerate into balls, with the result that the volatile isocyanate is not removed or is incompletely removed and no readily filterable residue is produced. The chlorinated aromatic hydrocarbons, dioctylphthalate, trioctylphosphate and oils such as "Nujol," do not produce the desirable granular solid residues which higher boiling oils of high naphthenic hydrocarbon content produce. Solvents like the chlorinated hydrocarbons dissolve part of the residue, thus making recovery of the solvent very expensive, or impractical.

In order to recover the organic isocyanate and to convert the residual non-volatile tar into an easily filterable granular solid, the process of the present invention is carried out at temperatures of from about 200° to 315° C. and at absolute pressures ranging from less than 1 mm. to about 80 mm. of mercury. When operating in the lower range of temperature with a more volatile product such as toluene-2,4-diisocyanate, the lower pressures are generally employed to assure a practical rate of distillation of the diisocyanate from the tar. When operating in the range of around 300° C., the higher pressures are sufficient. In other words, the volatility of the product determines the particular temperature-pressure relationship to be employed. As illustrated in Example 5, the recovery of the 4,4'-diisocyanatodiphenylmethane, which has a low volatility, is preferably carried out at high temperature and low pressure. In such case, the original reaction mass in which the diisocyanate is produced can be directly distilled from these high boiling oils.

Temperatures appreciably above 300° C. are avoided to minimize volatilization and possible decomposition of the oil and isocyanate. The lower temperature limit is determined by the volatility of the isocyanate and by the fact that the granular, readily filterable residues are usually best obtained at these temperatures.

An essential feature of the invention is the conversion of the tar residues into an insoluble non-volatile solid which may be readily removed from the oil by screening, filtering, centrifuging or decanting. The oil can be used indefinitely without further purification. When the tar is reduced to the solid state as distinguished from being dissolved in a miscible liquid, the equipment is more readily cleaned and the process is much easier to operate. The process can be operated batch-wise or continuously, and no special equipment is required since all operations can be performed in the conventional chemical processing equipment.

In the accompanying drawing which forms a part of the specification, a diagrammatic illustration is given of a set-up for carrying out a continuous process according to the present invention. In the continuous process illustrated, the crude isocyanate from which the pure isocyanate is to be recovered is sucked from the hold tank 1 into the circulating oil of high naphthenic content which is held at operating temperatures of from 200° to 315° C. either through the circulating line 2 or (in the case of batch operation) directly into the flash kettle 3 through line 2a. The oil in the flash kettle may be under agitation either by means of a stirrer 4 operated by a motor 4a or by introducing the line 2 into the flash kettle tangentially so as to cause agitation of the oil. In continuous operation the naphthenic hydrocarbon oil is heated by passing through a heater 5. In ordinary batch operation kettle 3 may be a jacketed kettle and heat may be applied directly to the kettle by any conventional means to maintain the contents at reaction temperature. The volatile ingredients of the reaction mass, namely, the isocyanate and the low boiling organic solvent (where one is employed) are immediately flashed from the kettle 3 and passed through pipe line 3a into a still 6 from which the lower boiling solvent is removed as the overhead and passed through condenser 7 into receiver 8 while the isocyanate is removed from the bottom of the still into the receiver 9. The required vacuum in the receivers and in the flash kettle 3 is maintained by a vacuum pump 10 which is shown connected through the receiver 8. The hot oil containing the non-volatile tarry residue suspended in granular form in the oil is continually drawn from the bottom of the kettle 3 through pipe 20 and a positive displacement pump 12 and recycled through lines 21, 22 and the oil heater 5. When the concentration of the tar residues in the oil reaches the maximum point for efficient operation, a portion is withdrawn from the line 21 by the pump 14 and passed into an agitated hold tank 15 with agitator 15a and motor 15b. The oil containing the suspended tar residue is then passed through a centrifuge 16 from which the tar residues are removed at 17 while the oil passes on to the hold tank 18 from which it may be recirculated through line 23 into the line 22 from the pump 12 then through the heater 5, for re-use in the system. New oil may of course be introduced into the system when necessary, such as at 19 through the hold tank 18. The valves in the pipe lines are indicated by the conventional designation.

While the isocyanate recovered from the receiver 9 is usually of high purity, it may contain a small amount of entrained oil. This oil can be separated from the isocyanate in a conventional still (not shown), from which the recovered oil may be returned to the system. The rate of flow of the material through the system, or the bypassing of certain portions of the system, is of course regulated by suitable valves.

For efficient operation it is preferred that the granular residue concentration in the oil in the still 3 should not exceed about 20% to 25% of the weight of the oil. In the continuous system the concentration of the granular residue in the oil is preferably held at from 5% to 10%.

The amount of oil employed in the system will usually depend upon the amount of tar residues present in the crude isocyanate, and to some extent upon the amount of oil required to supply the heat necessary to maintain the operating temperatures in the flash kettle to effect distillation of the volatile constituents. The oil of course may be heated by the external heater as illustrated in the accompanying drawing, or by heating elements in or through a jacket on the kettle 3. As illustrated particularly in the following Example 2, the process may be carried out as a batch process and does not necessarily have to be carried out as a continuous process under the concept of the present invention.

The following examples are given to illustrate the invention in detail. The parts used are by weight, unless otherwise specified.

Example 1

In carrying out the process of this invention in a continuous manner, the tar flash kettle 3 is filled to the desired level with a naphthenic hydrocarbon oil having a viscosity of 200 seconds Saybolt Universal viscosity at 210° F. The system is evacuated to approximately 5 mm. of mercury by the vacuum pump 10 and the oil in the vessel is heated to about 210° C. Concentrated tar residue containing isocyanate from the hold tank 1 is passed into the oil in the flash kettle 3 at the rate of approximately 68 parts per hour, giving about 30 parts of solid granular suspension of non-volatile tar material in the oil which is circulated at the rate of approximately 500 parts of oil per hour by means of slurry pump 14 through the centrifuge or filter 16, the oil being returned to the flash kettle 3. The recovery of the isocyanate which is flashed from the hot oil is condensed and collected in the receiver 9 in the recovery of approximately 97% of the total isocyanate content of the original tar material. Sufficient oil is used in the flash kettle so that the solids level of the non-volatile tar residue in the oil will be maintained at a level of approximately 6%. If it is desired, the isocyanate collected in the receiver 9 may be redistilled in the conventional still to free it from any small amount of oil that may be carired over as entrained liquid in the isocyanate vapors. In this example the crude isocyanate mass had been distilled to free it from solvents and the major portion of the isocyanate. All of the oil containing the granular non-volatile tar material was continually passed through the filter or centrifuge with recirculation of the clean oil to the flash kettle.

Example 2

750 parts of a naphthenic hydrocarbon oil having a Saybolt Universal viscosity of 200 seconds at 210° F. are placed in a vessel equipped with an agitator and a condenser leading to a receiver. The system is evacuated to an absolute pressure of 8 to 10 mm. of mercury, and the stirred oil is heated to 240° C. To this oil is fed over a period of 35 minutes, 375 parts of a residue from the distillation of toluene-2,4-diisocyanate containing 55.9% of toluene-2,4-diisocyanate. The distillate collected in the receiver weighs 215 parts, has a freezing point of 20.9° C. and is 97.2% toluene-2,4-diisocyanate as determined by analysis. The recovery of the diisocyanate is 99.8% of that present in the original tarry residue. The residue that remains behind in the oil as a granular suspended solid is readily separated from the oil by screening through a 20-mesh screen.

The distillation residue obtained from the distillation of 4-methoxy-m-phenylene diisocyanate, produced in the phosgenation of 2,4-diaminoanisole, may be substituted for the tar containing toluene-2,4-diisocyanate in the above example. When this residue is subjected to the same conditions described above, 4-methoxy-m-phenylene diisocyanate distills therefrom, appearing in the receiver as a solid product, and the non-volatile portion remains behind in the oil as a granular suspension.

Example 3

In a 50 gallon jacketed kettle, equipped with an agitator and a condenser leading to a receiver, are placed 200 parts of a naphthenic hydrocarbon oil having a viscosity of 200 seconds Saybolt Universal viscosity at 210° F. The system is evacuated to a pressure of 5 mm. of mercury and the oil is heated to 213° C. Sixty (60) parts of a distillation residue containing 56% toluene-2,4-diisocyanate are fed into the heated, agitated oil over a period of 53 minutes. The temperature ranges from 202° to 213° C. at pressures of from 5 to 9 mm. of mercury. The recovery of tolylene diisocyanate as distillate is essentially quantitative, as 35 parts are collected containing 97.5% toluene-2,4-diisocyanate. The non-volatile portion of the residue is found suspended in the oil as a granular solid and is readily separated from the oil by filtration.

Example 4

400 parts of a naphthenic oil having a viscosity of 200 seconds Saybolt Universal viscosity at 210° F. are heated to 250° C. at an absolute pressure of 70 mm. of mercury in an agitated vessel equipped with a condenser leading to a receiver. To this oil are fed 210 parts of a residue from the distillation of a mixture of toluene diisocyanates, containing 80% of the 2,4-isomer and 20% of the 2,6-isomer, and analyzing as 49.2% toluene diisocyanate. 75 parts of a distillate are obtained, analyzing 96.9% toluene diisocyanate and corresponding to a recovery of 71% of the quantity present in the tar.

Example 5

This example illustrates the recovery of an organic isocyanate such as 4,4'-diisocyanatodiphenylmethane, which is not normally isolated by conventional distillation because of its high boiling point and its tendency to decompose during prolonged heating, free from tar, as a solid of good quality by flash distillation by the process of this invention.

400 parts of a naphthenic hydrocarbon oil having a viscosity of 220 seconds Saybolt Universal viscosity at 210° F., contained in a suitable vessel as described above in Example 4, are heated to 310° C. at a pressure of 1 to 2 mm. of mercury. A crude preparation of 4,4'-diisocyanatodiphenylmethane totaling 368 parts and containing about 85% of the diisocyanate, is fed into the hot oil. A two-phase distillate weighing 339 parts is obtained which on analysis is shown to contain 206 parts of the diisocyanate. The upper layer representing 31% of the whole is entrained oil; the lower layer consists of crystalline 4,4'-diisocyanatodiphenylmethane (about 61%) plus entrained oil (about 8%). Approximately 66% of the diisocyanate originally present in the crude feed is recovered. The entrained oil can be returned to the tar flash kettle.

Example 6

Into a jacketed, agitated vessel having a packed distillation column attached and a condenser and receiver attached to the column, the whole assembly being capable of being evacuated, there is charged 600 parts of a high boiling naphthenic hydrocarbon oil which has a Saybolt Universal viscosity of 150 seconds at 210° F. The pressure on the system is reduced to 20 mm. of mercury and the oil is heated to 235° C. while agitating. There is then gradually added to the agitated oil 378 parts of crude toluene-2,4-diisocyanate analyzing 89.6% toluene-2,4-diisocyanate. This has been prepared by phosgenating toluene-2,4-diamine in o-dichlorobenzene and then stripping off the solvent. The addition is made at a uniform rate over a period of 85 minutes. The toluene-2,4-diisocyanate distills through the column and collects in the receiver. The residue from the crude diisocyanate remains behind in the oil as a granular suspended solid which is subsequently readily separated from the oil by filtration. 324 parts of distillate are recovered, analyzing 98.84% toluene-2,4-diisocyanate.

Example 7

Into the same equipment as Example 6, is charged 600 parts of a naphthenic hydrocarbon oil having a Saybolt Universal viscosity of 150 seconds at 210° F. The pressure in the system is reduced to 20 mm. and the oil is heated to 235° C. while agitating. To this is added a crude phosgenation mass obtained by phosgenating toluene-2,4-diamine dissolved in o-dichlorobenzene and then blowing with nitrogen to remove dissolved phosgene and hydrogen chloride. 2835 parts of the phosgenation mass containing 11.05% toluene-2,4-diisocyanate is added over a period of 5 hours. The distillate contains 313 parts of toluene-2,4-diisocyanate. The residue in the oil is a suspended granular solid which is removed from the oil by filtration. The oil is then ready for recycling to the equipment for the next charge without any further treatment.

In a variation of this procedure, the distillate instead of being run to a receiver is introduced into a heated fractionating column also maintained at 20 mm. of mercury pressure and the o-dichlorobenzene vapors removed overhead while the liquid toluene-2,4-diisocyanate is taken off at the bottom.

*Example 8*

In a continuous unit as shown in the drawing, a crude toluene-2,4-diisocyanate at a temperature of 165° C. and prepared as illustrated in the previous examples, is passed from the feed tank 1, through a controller value, at a rate of 3585 pounds per hour, into the stream of a hot naphthenic hydrocarbon oil having a Saybolt Universal viscosity of 200 seconds at 210° F. in the circulating line 2. The oil is passed from the heater 5 at 250° C. at a rate of approximately 167,000 pounds per hour. The hot oil and the crude toluene-2,4-diisocyanate are mixed in the pipe line, and since the temperature is above the boiling point of toluene-2,4-diisocyanate at the pressure on the system, which is maintained at 20 mm. of mercury pressure, the mixture is ejected into the still 3 tangentially to give agitation to the oil residue in the still. The diisocyanate vapors pass through a condenser and the liquid toluene-2,4-diisocyanate is collected in receiver 9 at a rate of 3070 pounds per hour.

The tar present in the crude toluene-2,4-diisocyanate is carried along with the naphthenic hydrocarbons oil in the form of a finely divided suspended solid. The oil is continuously removed from the still at a temperature of about 230° C. by pump 12, and recycled to oil heater 5 from whence it returns to the still. The oil holdup in the still amounts to about 2000 parts.

From this return line, 3740 parts per hour of the oil containing the granular residue is withdrawn by pump 14 which passes the mass into hold tank 15 at atmospheric pressure. From the hold tank it flows to centrifuge 16 where the granular solids are removed at a rate of 374 pounds per hour. The clean oil passes to hold tank 19 where it is fed back into the evacuated system through a controlled valve.

It will be obvious from the examples above given that the process of this invention may be carried out in a batch process, in which case the crude isocyanate solution containing the tars is dropped directly into the hot oil in the flash kettle, and, after the concentration of the solid granular suspension of the non-volatile tar material in the oil has reached the desired point, the reaction is stopped and the oil is filtered to free it from this granular suspension. This oil of course may be used in carrying out subsequent distillations.

We claim:

1. A process for recovering organic isocyanates from the crude reaction mixtures in which they are formed during their manufacture or from concentrated tarry residues after preliminary distillation of a substantial portion of the organic isocyanates therefrom, which comprises dropping the organic isocyanate solution containing the non-volatile tarry residue into a naphthenic hydrocarbon oil which is held at a temperature of from 200° to 315° C. and at from 1 to 80 mm. mercury pressure whereby the organic isocyanate is vaporized and the insoluble residue is converted to a readily filterable granular solid in the oil, said naphthenic hydrocarbon oil being one that does not decompose or distill at the temperatures and under the pressures employed.

2. A continuous process for recovering isocyanates from the crude reaction mixtures in which they are formed during their manufacture or from concentrated tarry residues after preliminary distillation of a substantial portion of the organic isocyanates therefrom, which comprises continually passing the organic isocyanate solution containing non-volatile tarry residue into a naphthenic hydrocarbon oil maintained at a temperature of from 200° to 315° C. and at from 1 to 80 mm. mercury pressure whereby the organic isocyanate is vaporized and recovered by condensation and the insoluble residue is converted to a readily filterable granular solid in the oil, continually separating the insoluble residue from said oil by filtration and returning the oil to the system, the said naphthenic hydrocarbon oil being one that does not decompose or distill at the temperatures and under the pressures employed.

3. A process for recovering organic isocyanates from tars formed during their manufacture, which comprises dropping the organic isocyanate-tar solution containing from 10% to 95% by weight of the organic isocyanate into a naphthenic hydrocarbon oil which is held at a temperature of from 200° to 315° C. and at from 1 to 80 mm. mercury pressure whereby the organic isocyanate is vaporized and the insoluble residue is converted to a readily filterable granular solid in the oil, said naphthenic hydrocarbon oil being one that does not decompose or distill at the temperatures and under the pressures employed, and being used in a ratio of at least 1 of oil to 1 of tar.

4. A continuous process for recovering isocyanates from tars formed during their manufacture and isolation by distillation processes, which comprises continually passing the organic isocyanate-tar solution having an organic isocyanate content of from 10% to 95% by weight into a naphthenic hydrocarbon oil maintained at a temperature of from 200° to 315° C. and at from 1 to 80 mm. mercury pressure whereby the organic isocyanate is vaporized and recovered by condensation and the insoluble residue in converted to a readily filterable granular solid in the oil, continually separating the insoluble residue from said oil by filtration and returning the oil to the system, the said naphthenic hydrocarbon oil being one that does not decompose or distill at the temperatures and under the pressures employed, and being used in a ratio of at least 1 of oil to 1 of tar.

References Cited in the file of this patent

UNITED STATES PATENTS

| | | |
|---|---|---|
| 2,151,990 | Ruys | Mar. 28, 1939 |
| 2,315,422 | Hildebrandt | Mar. 30, 1943 |
| 2,406,648 | Weisberg | Aug. 27, 1946 |
| 2,417,131 | Schmitt | Mar. 11, 1947 |
| 2,474,735 | Harmon | June 28, 1949 |
| 2,502,485 | Saunders | Apr. 4, 1950 |